(12) United States Patent
Zuber

(10) Patent No.: US 7,357,461 B2
(45) Date of Patent: Apr. 15, 2008

(54) AXLE STRUCTURE FOR A MOTOR VEHICLE

(75) Inventor: Armin Zuber, Meckesheim (DE)

(73) Assignee: Benteler Automobiltechnik GmbH, Paderborn (DE)

(*) Notice: Subject to any disclaimer, the term of this patent is extended or adjusted under 35 U.S.C. 154(b) by 140 days.

(21) Appl. No.: 11/263,354

(22) Filed: Oct. 31, 2005

(65) Prior Publication Data
US 2006/0103099 A1    May 18, 2006

(30) Foreign Application Priority Data
Nov. 15, 2004    (DE)    ................. 10 2004 055 100

(51) Int. Cl.
*B60G 21/055*    (2006.01)

(52) U.S. Cl. ............ 301/124.1; 301/127; 280/124.153; 280/124.166

(58) Field of Classification Search ............. 301/124.1, 301/127, 130; 280/124.107, 124.109, 124.153, 280/124.166
See application file for complete search history.

(56) References Cited

U.S. PATENT DOCUMENTS

| | | | |
|---|---|---|---|
| 4,165,099 A * | 8/1979 | Wagner et al. ........ 280/124.116 |
| 4,200,326 A * | 4/1980 | Wilcox ........................ 295/23 |
| 5,129,672 A * | 7/1992 | Hiromoto et al. ..... 280/124.106 |
| 5,597,175 A * | 1/1997 | Tuan ..................... 280/124.111 |
| 5,800,024 A * | 9/1998 | Steimmel et al. ........... 301/127 |
| 5,909,888 A * | 6/1999 | Betz et al. ............ 280/124.166 |
| 6,487,886 B2 * | 12/2002 | Ueno et al. ..................... 72/57 |
| 6,516,913 B1 * | 2/2003 | Hartel et al. ................. 180/312 |
| 6,523,841 B2 * | 2/2003 | Glaser et al. ......... 280/124.106 |
| 6,543,857 B1 * | 4/2003 | Griffiths et al. ............. 301/127 |
| 6,550,869 B2 * | 4/2003 | Dantele ................... 301/124.1 |
| 6,749,209 B2 * | 6/2004 | Davison et al. ....... 280/124.116 |
| 2003/0205879 A1 * | 11/2003 | Davison et al. ....... 280/124.116 |
| 2004/0140659 A1 * | 7/2004 | Kato et al. ................... 280/785 |
| 2006/0131829 A1 * | 6/2006 | Alesso et al. ......... 280/124.166 |
| 2006/0175786 A1 * | 8/2006 | Streubel et al. ....... 280/124.134 |

FOREIGN PATENT DOCUMENTS

| | | |
|---|---|---|
| DE | 101 40 288 C1 | 8/2002 |
| DE | 20 2004 007 889 | 8/2004 |
| DE | 10 2004 055 099 A1 * | 5/2006 |

* cited by examiner

*Primary Examiner*—Russell D. Stormer
(74) *Attorney, Agent, or Firm*—Henry M. Feiereisen; Ursula B. Day

(57) ABSTRACT

An axle structure for a motor vehicle includes a body of U-shaped configuration with two longitudinal beams and a cross member interconnecting the longitudinal beams at one end thereof. Each longitudinal beam has ends formed as a neck. The longitudinal beams and the cross member are made of two identical metallic shells which extend in congruent relationship and are cemented to one another at least in sections thereof in sandwich-like manner.

12 Claims, 2 Drawing Sheets

AXLE STRUCTURE FOR A MOTOR VEHICLE

CROSS-REFERENCES TO RELATED APPLICATIONS

This application claims the priority of German Patent Application, Serial No. 10 2004 055 100.6, filed Nov. 15, 2004, pursuant to 35 U.S.C. 119(a)-(d), the subject matter of which is incorporated herein by reference.

BACKGROUND OF THE INVENTION

The present invention relates, in general, to an axle structure for a motor vehicle.

Nothing in the following discussion of the state of the art is to be construed as an admission of prior art.

Axle structures, also called sub-frames come in many variations, e.g. as a single shell sheet-steel module or double shell steel-sheet construction, whereby both constructions may be provided with reinforcements of sheet metal. Single shell axle structures have in general little stiffness, whereas double shell axle structures require a joining operation to connect the shells, normally by welding. This increases costs.

It would therefore be desirable and advantageous to provide an improved axle structure for a motor vehicle to obviate prior art shortcomings and to reduce weight and costs thereof while still being reliable in operation and satisfying stiffness and strength standards.

SUMMARY OF THE INVENTION

According to one aspect of the present invention, an axle structure for a motor vehicle includes a body of U-shaped configuration with two longitudinal beams and a cross member interconnecting the longitudinal beams at one end thereof, each longitudinal beam having ends formed as a neck, wherein the longitudinal beams and the cross member are made of two identical metallic shells which extend in congruent relationship and are cemented to one another at least in sections thereof.

The present invention resolves prior art problems by using identical parts in form of two identically designed shells of metal, e.g. steel sheet, which are placed in congruent relationship, i.e. in coincidental, spatial relationship and alignment, and cemented to one another, at least sectionwise through application of cement layers. The axle structure is thus configured in sandwich construction. The adhesive applied between the shells provides a firm bond between the shells.

The provision of identically configured shells results not only in less tool costs but also in a significant reduction in logistics. As the shells are bonded by one or more cement layers, shape tolerances have essentially no effect on the joining process. The axle structure is simple while still providing sufficient space for receiving bearings in the area of the necks. The sandwich construction of the axle structure in the form of identical shells that are cemented together permits realization of significant moments of inertia while having substantial structural stiffness. By applying adhesive at a selected length in longitudinal direction of the longitudinal beams as well as to the cross member including the areas of the necking, buckling strength and twist stiffness of the axle structure can be tailored as desired.

According to another feature of the present invention, a first cement layer may be applied between a central length portion of the longitudinal beams and the cross member, and a second cement layer may be applied in an area of the neck. Suitably, the thickness of each of the first and second cement layers corresponds approximately to twice a metal sheet thickness of the shells. Although this dimensioning is currently preferred, other dimensions are, of course, also conceivable.

According to another feature of the present invention, the cross member may have a trapezoidal configuration with lateral shanks diverging from one another and terminating in flanges. The flanges may extend at different planes. The shanks of the cross member, on one hand, and the necks, on the other hand, point in different directions.

According to another feature of the present invention, the longitudinal beams may have a rectangular cross section.

According to another feature of the present invention, each of the first and second cement layers may be polyurethane foam or epoxy adhesive for joining the shells. Of course, also any combination of polyurethane foam and epoxy adhesive may be conceivable in different spaced-apart sections of the axle structure for joining the shells. In this way, static and dynamic load behavior can be influenced. For example, a cement layer of epoxy adhesive may be applied in the area of the necks, while a cement layer of polyurethane foam may be applied in central length sections of the longitudinal beam as well as cross member. In this way, different sections may vary in buckling strength and twist stiffness.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
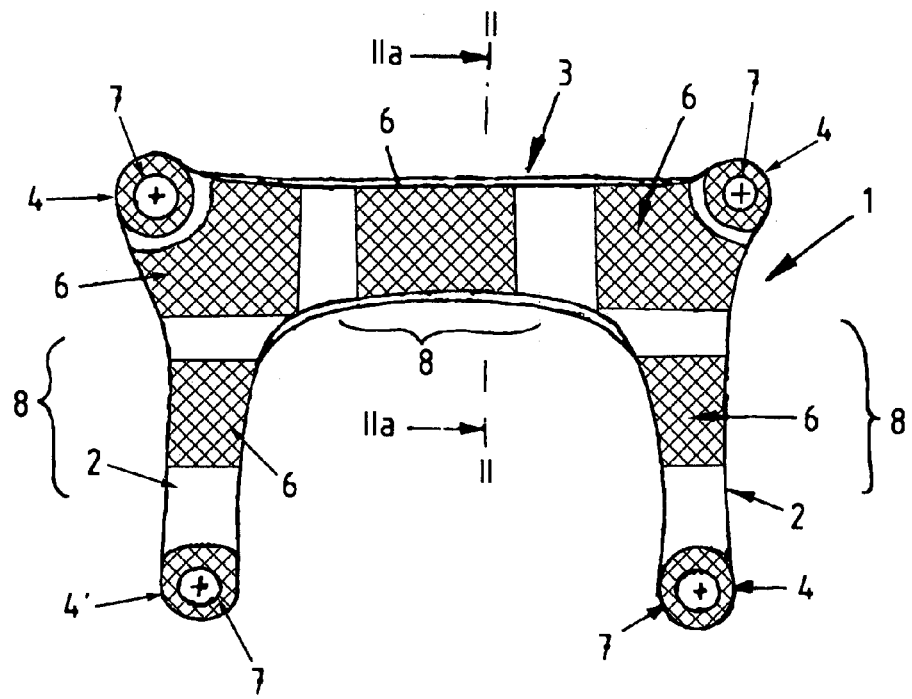
FIG. 1 is a schematic illustration of an axle structure according to the present invention for use in a motor vehicle.

Throughout all the figures, same or corresponding elements are generally indicated by same reference numerals. The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views.

Turning now to the drawings, and in particular to FIG. 1, there is shown a schematic illustration of an axle structure according to the present invention, generally designated by reference numeral 1, for use in an unillustrated motor vehicle, especially passenger car. The axle structure 1 has a body of U-shaped configuration and includes two longitudinal beams 2 and a cross member 3 interconnecting the longitudinal beams 2 at one end thereof. Each cross-member-proximal end of the longitudinal beams 2 is formed with a neck 4, and each cross-member distal end of the longitudinal beams 2 is formed with a neck 4', as shown in more detail in FIG. 2.

Figure 2:
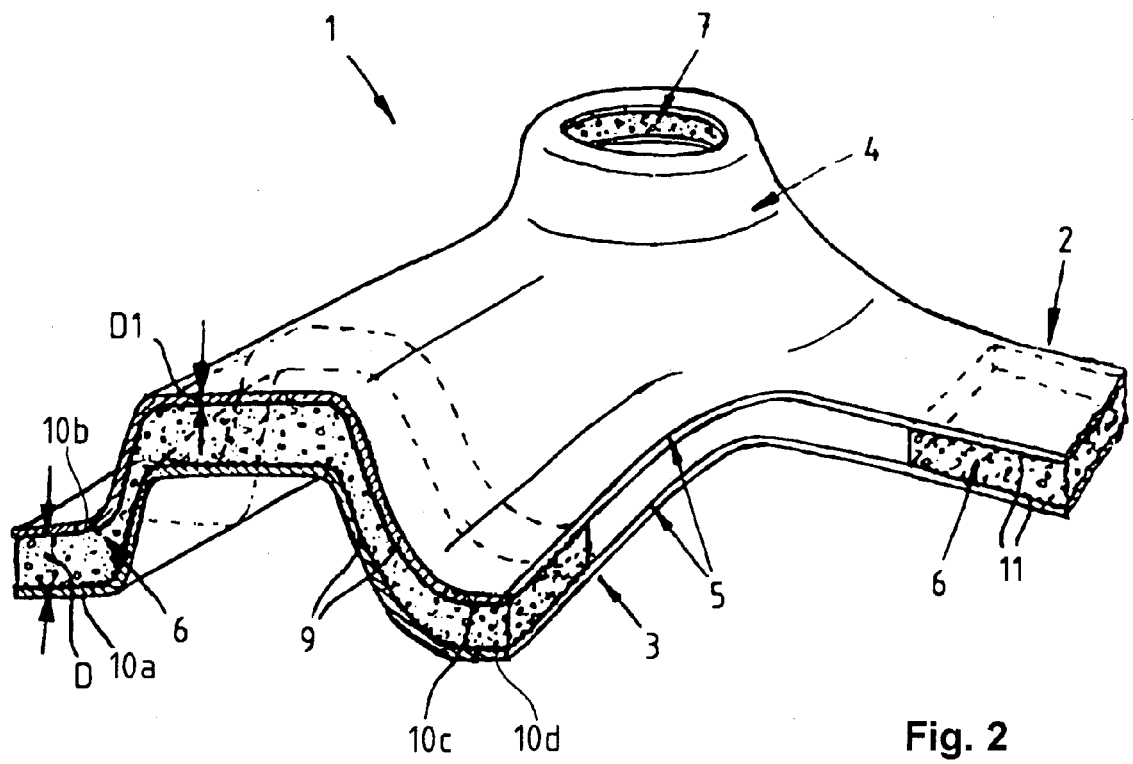
FIG. 2 is a vertical cross section of the axle structure, taken along the line II-II in the direction of arrows IIa.

The longitudinal beams 2 and the cross member 3 are formed of two identically configured shells 5 of steel sheet which are joined together in sandwich-like manner in congruent relationship by cement layers 6, 7. As shown in FIGS. 1 and 2, the cement layers 6 are applied in central length sections 8 of the longitudinal beams 2 as well as the central member 3, while the cement layers 7 are applied in the area of the necks 4, 4'. The cement layers 6, 7 have hereby a thickness D which corresponds approximately to twice the metal sheet thickness $D_1$ of the shells 5.

Figure 3:
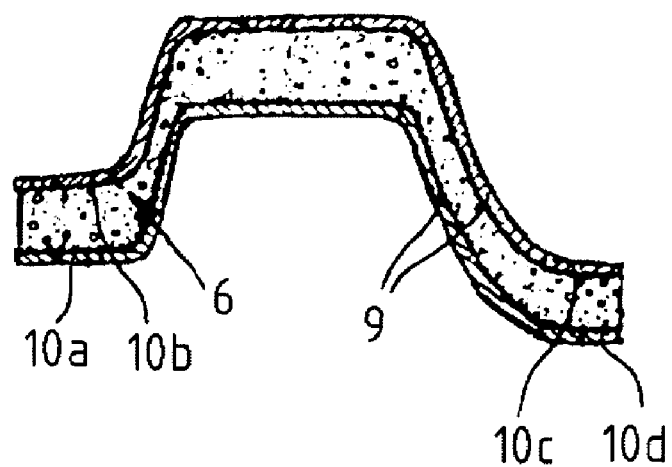
FIG. 3 is a detailed cutaway view of a cross member of the axle structure, illustrating the disposition of flanges of the cross member in different planes.
Figure 4:
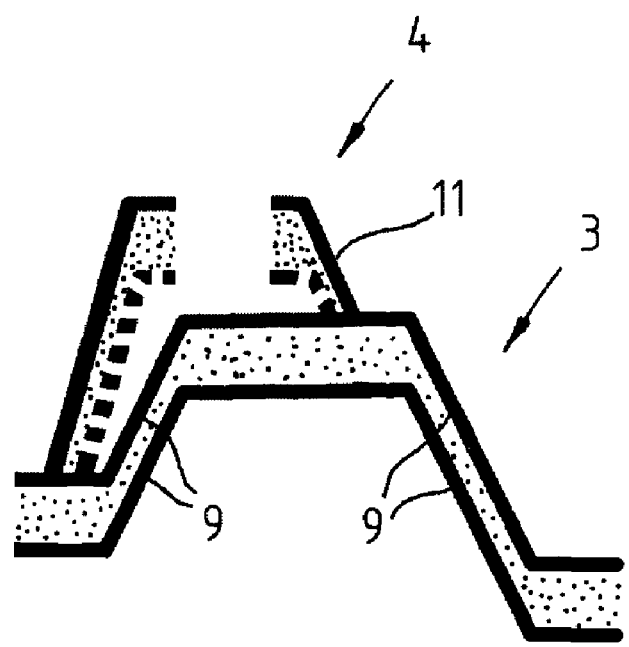
FIG. 4 is a schematic illustration of the cross member and a neck of a longitudinal beam.

In the non-limiting example of FIGS. 1 and 2, the cross member 3 has a trapezoidal cross section with lateral shanks 9 which diverge from one another and respectively terminate in flanges 10a, 10b, 10c, 10d, respectively. The flanges 10a, 10b, 10c, 10d extend hereby at different planes, as shown in FIG. 3. The longitudinal beams 2 have a rectangular cross section. As shown in FIG. 4, the shanks of the cross member 3, on one hand, and the shanks 11 of the necks 4, 4', on the other hand, point in different directions.

The cement layers 6, 7 may be made of polyurethane foam or epoxy adhesive. Various combinations are conceivable. For example, the cement layers 6 may be made of polyurethane foam whereas the cement layers 7 may be made of epoxy adhesive.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An axle structure for a motor vehicle, comprising a body having a U-shaped configuration in cross section and including two longitudinal beams and a cross member interconnecting the longitudinal beams at one end thereof, each longitudinal beam having ends formed as a neck, wherein the longitudinal beams and the cross member are made of two identical metallic shells which extend in congruent relationship and are cemented to one another at least in sections thereof.

2. The axle structure of claim 1, wherein a first cement layer is applied between a central length portion of the longitudinal beams and the cross member, and a second cement layer is applied in an area of the neck.

3. The axle structure of claim 2, wherein the thickness of each of the first and second cement layers corresponds approximately to twice a metal sheet thickness of the shells.

4. The axle structure of claim 1, wherein the cross member has a trapezoidal configuration with lateral shanks diverging from one another and terminating in flanges.

5. The axle structure of claim 1, wherein the longitudinal beams have a rectangular cross section.

6. The axle structure of claim 2, wherein the first and second cement layers are made of polyurethane foam.

7. The axle structure of claim 2, wherein the first and second cement layers are made of epoxy adhesive.

8. The axle structure of claim 2, wherein one of the first and second cement layers is made of polyurethane foam, and the other one of the first and second cement layers is made of epoxy adhesive.

9. The axle structure of claim 2, wherein the first cement layer is made of polyurethane foam, and the second cement layer is made of epoxy adhesive.

10. The axle structure of claim 4, wherein the flanges extend at different planes.

11. The axle structure of claim 4, wherein the shanks of the cross member and the neck point in different directions.

12. The axle structure of claim 1, wherein the neck projects out from an outer surface of the longitudinal beam.

* * * * *